Figure 1:
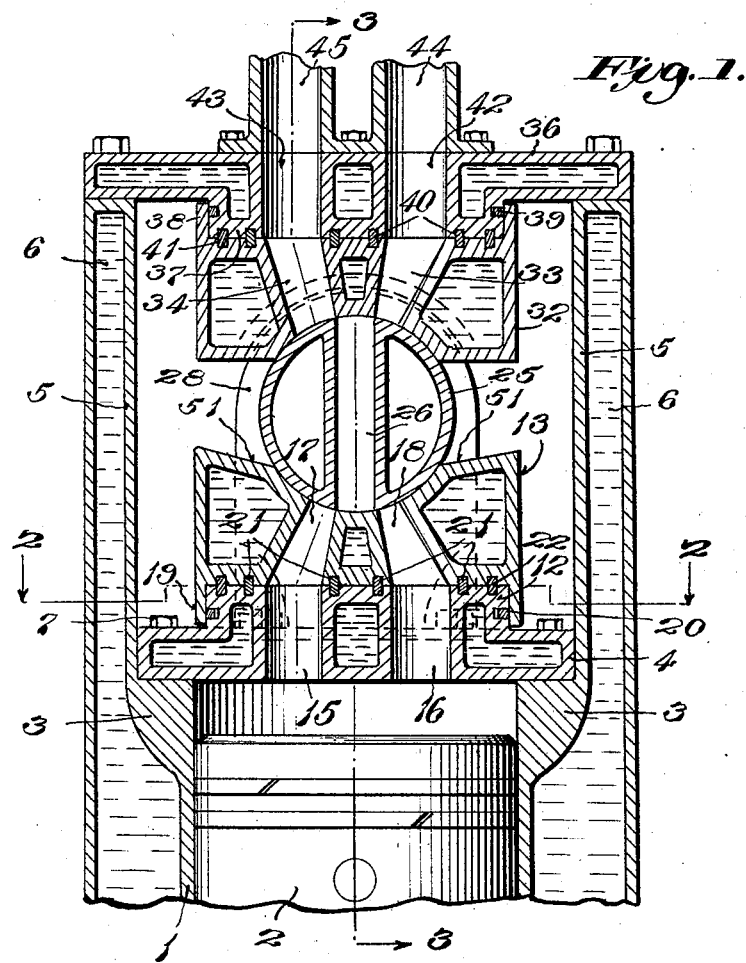

Aug. 16, 1932.  D. D. DE LOACH  1,871,502

ROTARY VALVE

Filed Feb. 7, 1928  2 Sheets-Sheet 1

Inventor
D. D. De Loach
By Prentiss, Stone & Boyden
Attorneys

Aug. 16, 1932.   D. D. DE LOACH   1,871,502
ROTARY VALVE
Filed Feb. 7, 1928   2 Sheets-Sheet 2

Inventor
D. D. De Loach
By Prentiss, Stone & Byden
Attorney

Patented Aug. 16, 1932

1,871,502

UNITED STATES PATENT OFFICE

DOUGLAS D. DE LOACH, OF SAVANNAH, GEORGIA, ASSIGNOR TO FOSS-DE LOACH COMPANY, OF SAVANNAH, GEORGIA, A CORPORATION OF GEORGIA

ROTARY VALVE

Application filed February 7, 1928. Serial No. 252,537.

This invention relates to internal combustion engines and has particular reference to a novel and improved rotary valve mechanism of the same general character as that disclosed in Reissue Patent No. 16,816, issued to Christian C. Foss and Douglas D. De Loach on December 13, 1927.

The primary object of the present invention is to provide a rotary valve for an internal combustion engine which shall be disposed between diametrically opposed valve seats that are mounted for movement with respect to the valve and which shall utilize the force of the explosion in the engine cylinder to effectively seal the contacting surfaces between such valve seats and the valve.

Another object is to provide a novel construction whereby an effective seal is established between the valve seat and engine head thereby confining the intake and exhaust gases to their respective ports and preventing the admixture of air or other fluid therewith.

A further object is to provide an exhaust port for the burned gases of such shape that sufficient pressure will be exerted on the lower floating valve seat to insure sealing contact between such seat and the valve, but which shall permit ready and rapid discharge of the burned gases from the engine cylinder without creating pressure on the upper valve seat.

A still further object is to provide a simple and effective means for cooling the valve and valve seats during operation and for insuring proper lubrication of the various parts to reduce friction and wear to a minimum.

With these and other objects in view, the invention may be stated to consist in the various novel features of construction and arrangement or combination, all of which will be fully described hereinafter and pointed out in the appended claim.

Figure 2:
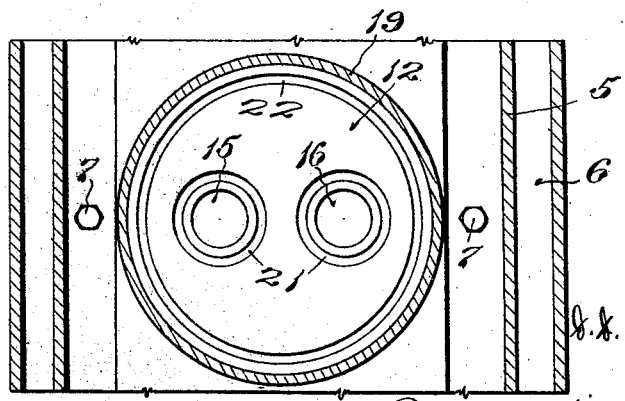
Figure 3:
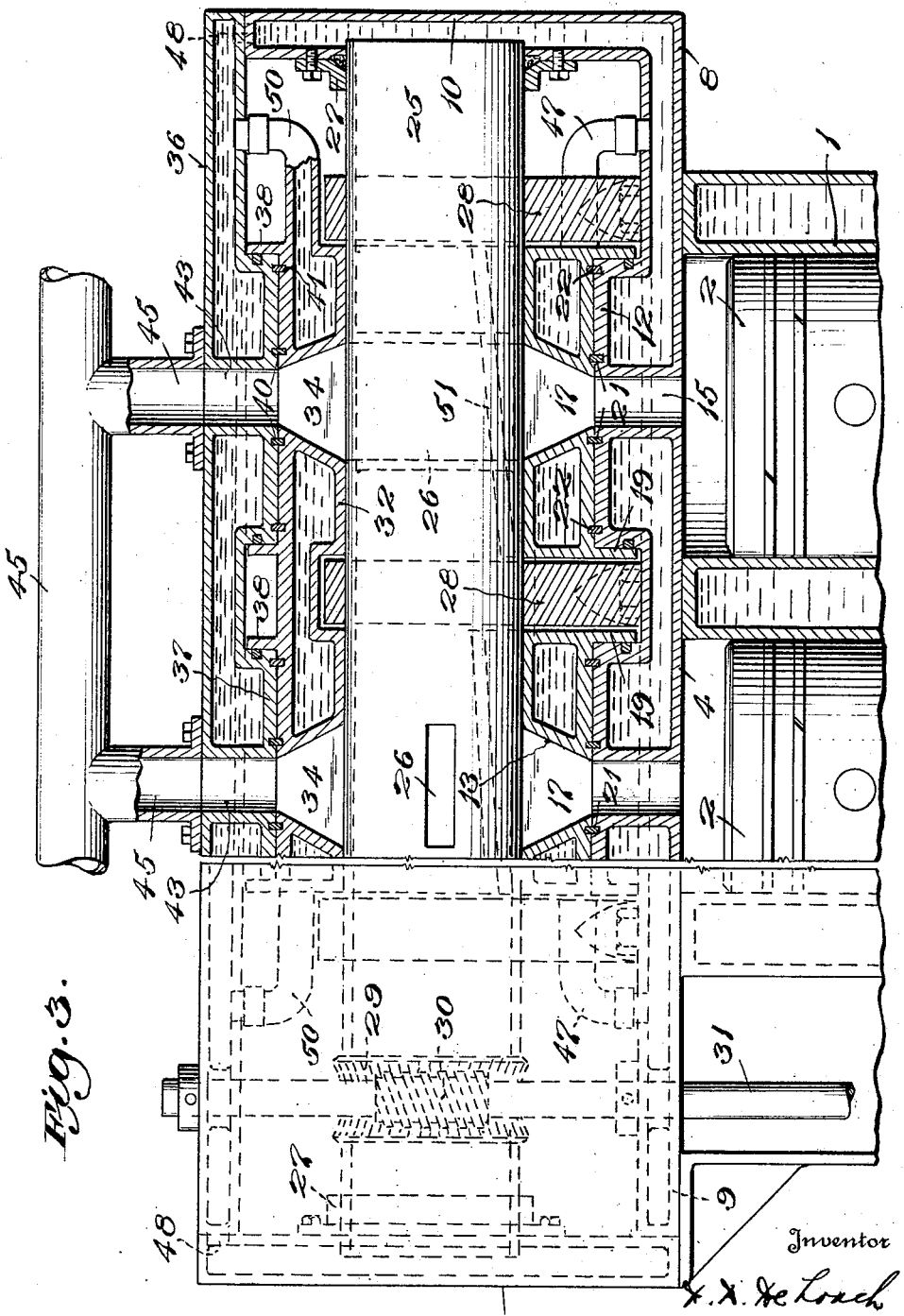

In the drawings accompanying and forming a part of this application,

Fig. 1 is a fragmentary vertical sectional view through an internal combustion engine constructed in accordance with my invention; and Figs. 2 and 3 are respectively horizontal and vertical sectional views taken on the lines 2—2 and 3—3 respectively.

In disclosing my invention I will describe in detail an illustrative embodiment thereof as shown in the accompanying drawings, but it will be understood that various changes may be made within the scope of the appended claim without departing from the spirit of the invention.

Describing the various parts by reference characters, 1 denotes the cylinder wall, and 2 the piston of an internal combustion engine. As shown particularly in Fig. 1, the upper portion of the cylinder wall is enlarged at 3, to define a support for the engine cylinder head 4, and is then continued upwardly as at 5 to form an enclosure for the rotary valve mechanism. A suitable water jacket 6 surrounds the cylinder walls and the wall 5 forming the valve enclosure.

Secured to the enlarged portion 3 of the cylinder by bolts 7 or other suitable fastening means is the engine head 4. As shown in Fig. 3, the head, in the case of a multi-cylinder engine, is preferably of unit construction and extends beyond each end of the cylinder block, as indicated at 8 and 9. The end portion 8 is formed with an upwardly extending portion 10 which defines one end of the valve mechanism enclosure while the opposite end 9 forms an abutment for an end plate 11 that normally closes the opposite end of the aforementioned valve mechanism enclosure. The engine head 4 is formed with an upstanding circular projection 12 in axial alignment with each cylinder and each of these projections is adapted to receive a lower valve seat denoted generally at 13.

Each of these projections and valve seats is identical in construction, and hence a detail description of the parts for one cylinder will suffice for all. Referring particularly to Figs. 1 and 2, it will be noted that each of the aforementioned circular projections 12 is formed with two circular ports 15 and 16, defining respectively intake and exhaust ports which communicate with the cylinder at their lower ends and at their upper ends with intake and exhaust ports 17 and 18 in the valve seat member 13. In order to secure a gas tight seal between the projection 12 and lower valve seat member 13, I preferably form said member with a depending skirt portion 19 which closely embraces the side wall of the projection, and in addition I insert a packing ring 20 in a circumferential recess in projection 12 which engages the inner wall of the skirt 19 as clearly shown in Fig. 1. I further seal the intake and exhaust ports by inserting a packing ring 21 in complementary recesses about each port, and a packing ring 22 disposed adjacent the circumferential edge of projection 12, and likewise seated in complementary recesses in member 13 and projection 12. This arrangement of packing rings 20 and 22 eliminates the use of a plurality of packing rings 21 about each port. In other words by placing packing rings 20 and 22 about the circumferential edge portion of projection 12, I seal both ports 15 and 16 simultaneously. From the foregoing description it will be apparent that each lower valve seat member may move vertically a limited distance to engage the rotary valve, as will become apparent hereinafter, and still effectively preserve the seal between the valve member and projection on the engine head and prevent escape or admission of gases to the intake and exhaust ports at the joint between these parts.

By referring to Figs. 1 and 3, it will be noted that I shape the intake and exhaust ports 17 and 18 in a peculiar manner. At the lower end, these ports are preferably circular to conform with the circular ports in projection 12, while at their upper ends the ports 17 and 18 are substantially oblong in shape. The side walls connecting the upper and lower ends of these ports are disposed at any angle to the vertical, as clearly shown in Fig. 1, so that exhaust gases escaping from the cylinder therethrough will exert a pressure on these sloping walls and tend to slightly force the lower valve seat member into engagement with the rotary valve 25. The inclination of these walls is preferably at such an angle whereby back pressure is relatively small but still sufficient pressure is created in an upward direction on the lower valve seat member to normally urge the seat into engagement with the rotary valve. It will also be noted that the oblong shape of the upper end of these ports provides a relatively narrow port transversely, as viewed in Fig. 1, hence the valve opening between the rotary valve and valve seat member will be maximum practically instantaneously. In other words, the rotary valve 25 moves through a relatively few degrees to bring its corresponding shaped port 26 into alignment with the port in the valve seat member, hence the intake and exhaust gases will flow freely therethrough.

The rotary valve 25 is journalled at each end in suitable packing bearings 27 that are carried by the end walls 10 and 11 of the valve mechanism enclosure, and I preferably extend each end of the valve into the water jacket of these end walls so that cooling fluid may circulate through the valve also. If desired, the valve may also be journalled in bearing blocks 28 that are interposed between each projection 12 on the cylinder head. As indicated in dotted lines in Fig. 3, the valve is fitted with a worm gear 29 that meshes with a worm 30 which is carried by a vertical shaft 31 that may be driven from the rotating parts of the engine in any suitable manner not shown. The rotary valve is provided with a plurality of transverse oblong ports 26, one for each cylinder, and these ports are of substantially the same shape as the upper ends of the ports 17 and 18. It will of course be understood that the area of the oblong ports is at least equal to, or greater than, the circular area of ports 15 and 16, so that the gases may flow freely therethrough.

Disposed above and in engagement with the rotary valve is a unit upper valve seat member 32. This upper valve seat member is formed with intake and exhaust ports 33 and 34 for each cylinder, which are oblong at their lower ends and circular in shape at their upper ends. These ports are adapted to align respectively with the intake and exhaust ports in the lower member through the port 26 in the rotary valve. At this point it will be noted from an inspection of Fig. 1 that exhaust port 34 is enlarged at the end portion which communicates with port 26 in the rotary valve so that the exhaust gases may pass therethrough without back pressure and will be afforded a free exit so that the cylinder may be quickly cleared of all burned gases. Disposed above the upper valve seat member is a cover plate 36 which is fastened to the side walls 5 and end walls 10 and 11. This plate is formed with depending circular projections 37 in alignment with the engine cylinders, and the aforementioned upper valve seat member is provided with circular upstanding flanges 38 adapted to engage with the side walls of said projections. Suitable packing rings 39, 40, and 41 are interposed between the parts in the same manner as described in connection with the lower valve seat member and engine head. The cover plate in turn is formed with circular intake and exhaust ports 42 and 43 which align with the ports 33 and 34. The ports 42 and 43 communicate with suitable manifolds 44 and 45 respectively, one of which serves as the intake and the other exhaust manifold.

With the intake and exhaust ports constructed as above described, it will be obvious that the rotary valve need rotate through an angle of only a few degrees to obtain maximum opening for both the intake and exhaust ports hence insuring a maximum flow of gases into and out of the engine cylinder. This feature is accomplished by shaping the ports adjacent the valve so that transversely they are of relatively narrow dimensions but maximum area of opening is obtained by elongating the same longitudinally.

As shown in Fig. 1, it is obvious that the engine cylinder cooling fluid will circulate through the side walls and end wall 10 of the valve enclosure. This fluid also circulates through the lower valve seats through pipes 47 and through the rotary valve as previously described. Cooling fluid also circulates from end wall 10 through openings 48 to the top cover plate and through pipes 50 to the upper valve seat member. It is therefore obvious that the entire valve structure and housing enclosing the same will be cooled.

The lower valve seat members are preferably formed with downwardly and inwardly inclined upper surfaces 51 so that a pool of lubricant may be maintained thereon and fed to the bearing surfaces between the rotary valve and bearing blocks. In this manner, sufficient lubricant is carried by the rotor to lubricate the upper bearing block also.

I claim:—

In an internal combustion engine, an engine block having a cylindrical bore and a space above said bore, a cylinder head having an extension upstanding therefrom, a cover for the space above said cylinder bore, said cover having an extension depending therefrom and overlying said upstanding extension, a lower valve seat member supported on said upstanding extension and movable vertically, an upper valve seat member engaged with the depending extension of said cover, a rotary valve interposed between said members and having a transverse passage therethrough, said valve seat members and engine head and cover each having communicating intake and exhaust passages, a packing ring encircling each port and seated in said valve seat member and extension, and a second packing ring encircling both ports and seated in said member and extension.

In testimony whereof I affix my signature.

DOUGLAS D. DE LOACH.